United States Patent [19]

Fletcher et al.

[11] Patent Number: 4,779,833
[45] Date of Patent: Oct. 25, 1988

[54] MOUNTING HEAD FOR CAMERA, OR THE LIKE

[75] Inventors: Frank P. Fletcher, London; David W. Sherwin, Watford, both of Great Britain

[73] Assignee: A&C Limited, Middlesex, England

[21] Appl. No.: 30,984

[22] Filed: Mar. 27, 1987

[30] Foreign Application Priority Data

Mar. 27, 1986 [GB] United Kingdom ................ 8607775

[51] Int. Cl.⁴ ............................................. F16M 13/00
[52] U.S. Cl. .................................... 248/550; 248/183; 108/139
[58] Field of Search ............... 248/550, 558, 660, 661, 248/371, 415, 178, 179, 183, 186, 278, 289.1, 349; 108/139, 140, 103

[56] References Cited

U.S. PATENT DOCUMENTS

| 2,214,516 | 9/1940 | Vernon | 248/660 |
| 2,384,790 | 9/1945 | Bolsey | 248/186 |
| 2,773,989 | 12/1956 | Nestlerode | 439/12 |
| 3,123,330 | 3/1964 | Forbes-Robinson | 248/183 |
| 3,353,776 | 11/1967 | Clemens | 248/278 |
| 3,479,632 | 11/1969 | Galles | 248/349 |
| 3,486,629 | 12/1969 | Slaga | 248/349 |
| 3,958,787 | 5/1976 | Miller | 248/183 |
| 4,555,990 | 12/1985 | Egawa | 248/349 |

FOREIGN PATENT DOCUMENTS

| 240844 | 10/1962 | Australia | 439/12 |
| 1097268 | 1/1961 | Fed. Rep. of Germany | 248/186 |
| 1167545 | 4/1964 | Fed. Rep. of Germany | 248/177 |
| 2033059 | 1/1972 | Fed. Rep. of Germany | 248/183 |
| 2756297 | 6/1979 | Fed. Rep. of Germany | 248/178 |
| 960380 | 10/1949 | France | 248/183 |
| 61445 | 4/1982 | Japan | 108/139 |
| 1217079 | 12/1970 | United Kingdom | 248/183 |

Primary Examiner—Ramon O. Ramirez
Assistant Examiner—Robert A. Olson
Attorney, Agent, or Firm—Cushman, Darby & Cushman

[57] ABSTRACT

A mounting head for apparatus to be orientated, such as a camera, comprises a base, a drive contained in the base, a platform mounted on the base for rotation by the drive, a mounting module for mounting the apparatus to be orientated, mechanical fixing means on the platform and mating mechanical fixing means on the mounting module for releasably securing it to the platform, a fixed electrical input in the base, an electrical socket in the platform and a plurality of electrical connections between said electrical socket and said fixed electrical input which are maintained during rotation of the platform relative to the base; the mounting module further comprising an electrical connector matching the platform electrical socket which provides electrical connections to an electrical output in the mounting module. Optionally to increase its versatility further there is provided an intermediate module having two mechanical fixing means, one matching that on the platform and the other that on the mounting module, to allow the mounting module to be releasably secured to the platform via said intermediate module in situations where greater clearance over the platform is desired.

8 Claims, 6 Drawing Sheets

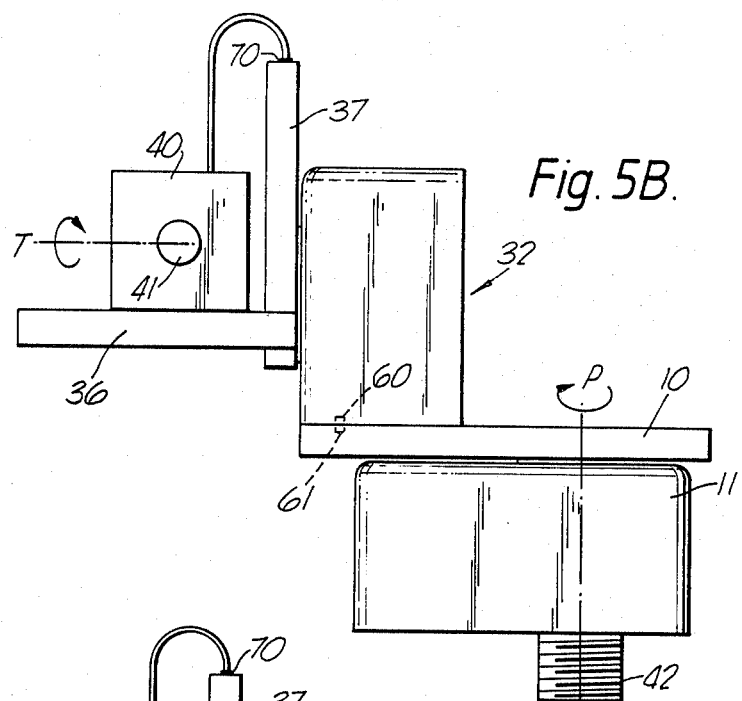
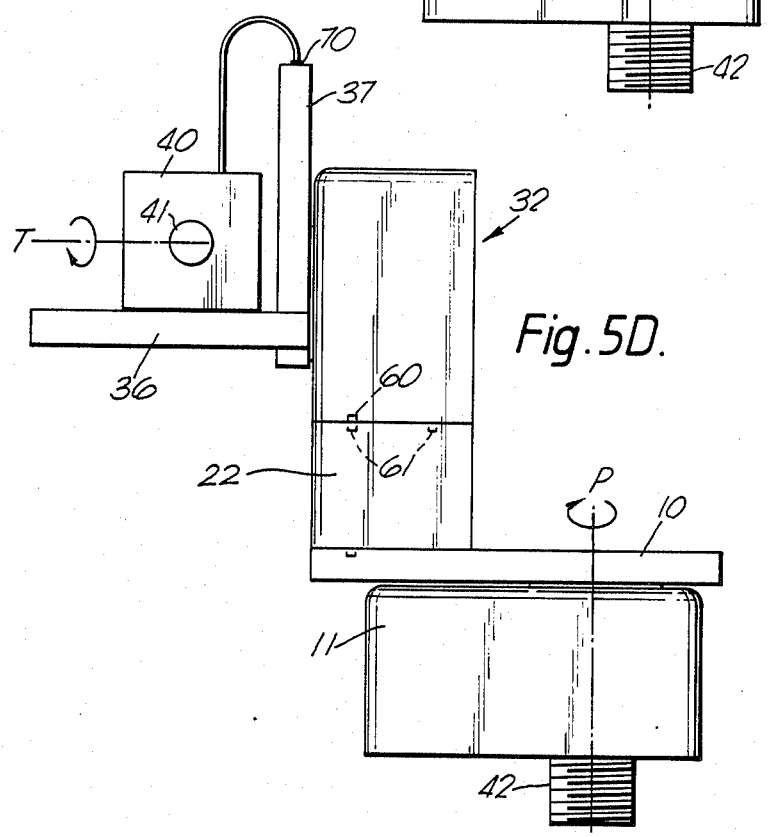

MOUNTING HEAD FOR CAMERA, OR THE LIKE

FIELD OF INVENTION

This invention relates to a mounting head for a camera or the like such as, for example, a spot-light, flood light, telescope or theodolite, or other apparatus which is to be mounted to exhibit scanning, panning or tilting or spin movement by rotation about a given axis.

The mounting head of the present invention is particularly advantageous when used for the mounting of a cinematograph or television/video camera.

BACKGROUND OF INVENTION

It is nearly always desirable to mount a cine or television camera on a mounting head carried by a suitable support (for example a dolly tripod or the like) so that the camera can be swivelled or pivoted relative to the support providing a panning, tilting or scanning motion in one plane or in two mutually perpendicular planes.

Panning refers to changing the vertical orientation of the camera lens with its axis moving in a horizontal plane, tilting refers to changing the vertical orientation of the camera lens with its axis moving in a vertical plane and spin refers to rotation of the camera about the lens axis.

If the axis of rotation passes through a point close to the lens of the camera called the nodal point, to a viewer of pictures taken the camera's position will appear unchanged during rotation. If rotation takes place about an axis not passing through this point both the orientation and the position of the camera will appear to be changing. It is thus often preferred that the mounting head be such that that panning and tilting rotation take place about axes passing through the nodal point of the camera.

There are conditions where mounting a camera on a head and providing the operator with unobstructed safe access to carry out tilting, panning etc. is extremely difficult. It then becomes desirable to use a head that can be controlled by an operator or by a computer whose location is not restricted to the immediate head area.

Further, it is preferred for panning and tilting to be available through a full 360 degrees. Providing for rotation about axes passing through the nodal point of a camera to be mounted and/or for full 360 degree panning and tilting means that the mounting head has to be made larger and heavier, than if it had to meet less stringent requirements.

For applications in which compactness and light weight are of greater importance, a small, light mounting head may be best even if it does not have full 360 degree panning and tilting abilities, or pivots on an axis not passing through the nodal point.

A user is likely to have different requirements for different applications. Existing remote controlled heads require the user to have one which will not be the best for some requirements or else to go to the expense of having several such heads. The user may not even find the type of head he would prefer available on the market, and the cost of constructing a head for a specific application is often likely to be too expensive and time consuming.

It is the object of the invention to provide a mounting head which is more versatile than those hitherto made, while yet being economic to manufacture and easy to handle.

SUMMARY OF THE INVENTION

According to the invention there is provided:

a mounting head for apparatus to be orientated comprising: a base, a drive contained in the base, a platform mounted on the base for rotation by the drive, a mounting module for mounting the apparatus to be orientated, mechanical fixing means on the platform and mating mechanical fixing means on the mounting module for releasably securing it to the platform, a fixed electrical input in the base, an electrical socket in the platform and a plurality of electrical connections between said electrical socket and said fixed electrical input which are maintained during rotation of the platform relative to the base;

the mounting module further comprising an electrical connector matching the platform electrical socket which provides electrical connections to an electrical output in the mounting module.

The mounting head according to the invention allows rapid installation of the module on the platform and subsequent rapid removal. This in itself makes packing and transport of the mounting head easier. Further by the provision of an additional intermediate module having two mechanical fixing means, one matching that on the platform and the other that on the module, the mounting module can be attached to the platform via said intermediate module, thus providing for greater clearance of the apparatus to be oriented over the platform. Such greater clearance may, for example, be required for a large camera if it is to be free to tilt through 360 degrees.

The mounting module may itself consist of a mounting plate rotatably mounted on a motor unit containing a drive for rotating the mounting place. The electrical output in the mounting module may thus be connected to an electrical motor providing this drive. Such mounting module may serve to provide for tilting of a camera, whereas the platform and base serve for panning.

Preferably the electrical socket and connector are so formed and positioned on the platform and mounting module that in positioning these for connection by the mechanical fixing means, the proper electrical contact will be established of itself. This greatly facilitates assembly and avoids the possibility of incorrect installation. In this case any intermediate mounting module will be formed with both a socket matching that on the platform and a connector matching that on the mounting module, with internal electrical connections between these formed inside the intermediate module. This avoids the problem of trailing electrical leads interfering with rotary motion.

The mechanical fixing means preferably allow the mounting module to mounted on the platform and/or the intermediate module in at least two different orientations. This allows the mounting head to take up different configurations and makes it more versatile. The electrical sockets and connectors should preferably be such that correct electrical contact is automatically established by the mere mechanical positioning of the platform and module(s) in the particular configuration.

For example if the mounting module can be installed in two orientations on the platform different by 180 degrees, then if the electrical connectors and sockets are made centrally symmetric with symmetrically opposite individual connectors in a socket connected to one another, correct contact can be achieved irrespective of orientation.

Provision for more than two different orientations of a module relative to the platform is also possible, with the fixing means, and electrical connectors having polygonal or circular symmetry.

Where the mounting module comprises a motor unit and rotatable mounting plate, it may be that in some orientations of the mounting module on the platform the rotatable mounting plate can only be rotated in a limited angular range without interfering with the platform. It is already known in existing mounting heads to provide a limiter system to prevent a motor from rotating a mounting plate to a position where the mounting plate (or a camera on it) might interfere with the platform and be damaged. In a preferred embodiment of the present invention the electrical connections established by mounting the mounting module on the platform (or an intermediate module) would automatically bring into action a limiter on the tilting motion where such limitation is necessary for one orientation of the mounting module, while cutting out the limiter for orientations in which it is not necessary.

The electrical output in the mounting module may wholly or partly be connected to another socket into which the camera or other apparatus is plugged. Like this a camera can be connected up without trailing leads causing any problems. The electrical connections on the platform socket may be used partly to drive a tilting motor in the mounting module and partly to provide an output to a camera or other apparatus.

BRIEF DESCRIPTION OF THE DRAWINGS

For a better understanding of the invention, together with the further objects and advantages thereof, the following detailed description of a preferred embodiment and the drawings may be referred to in which:

FIGS. 5A, 5B, 5C and 5D are side views illustrating possible configurations;

DETAILED DESCRIPTION OF A PREFERRED EMBODIMENT

Figure 1:
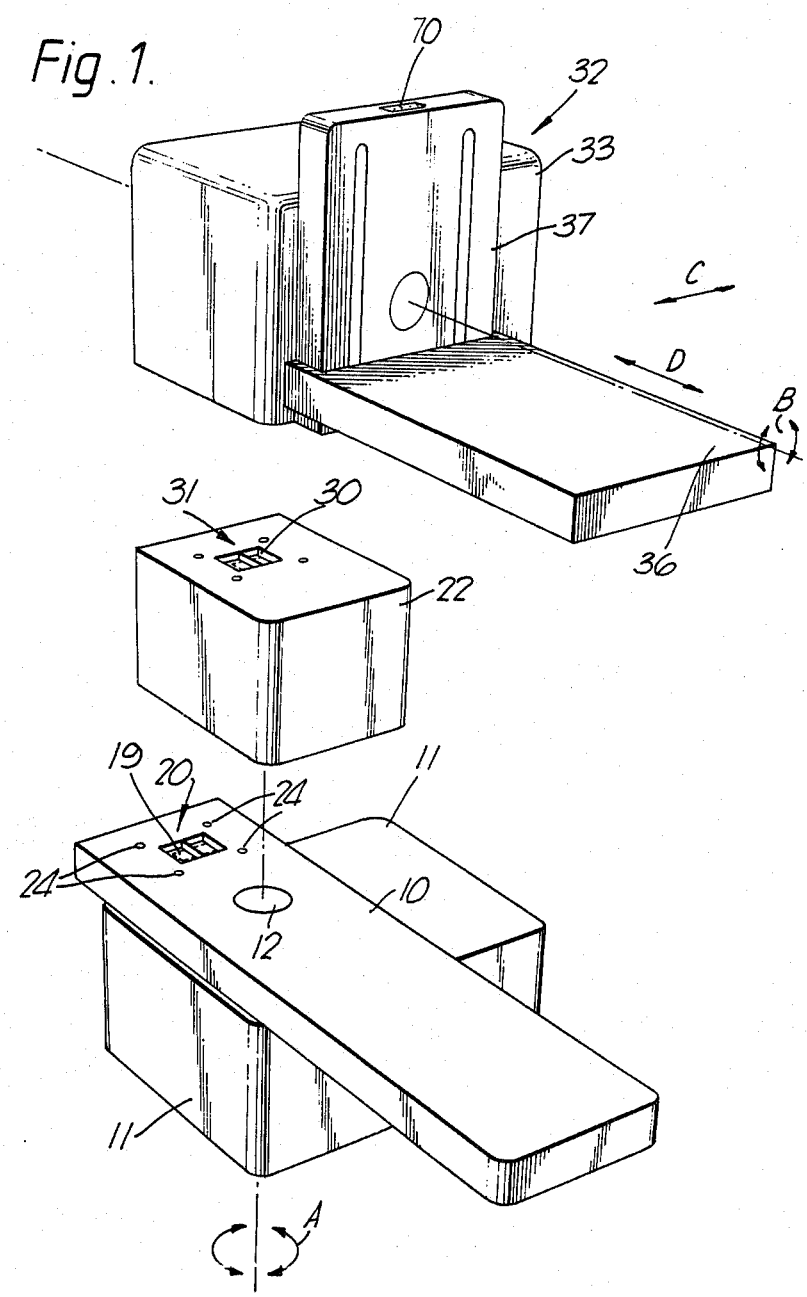
FIG. 1 is a perspective exploded view of a camera mounting head.
Figure 2:
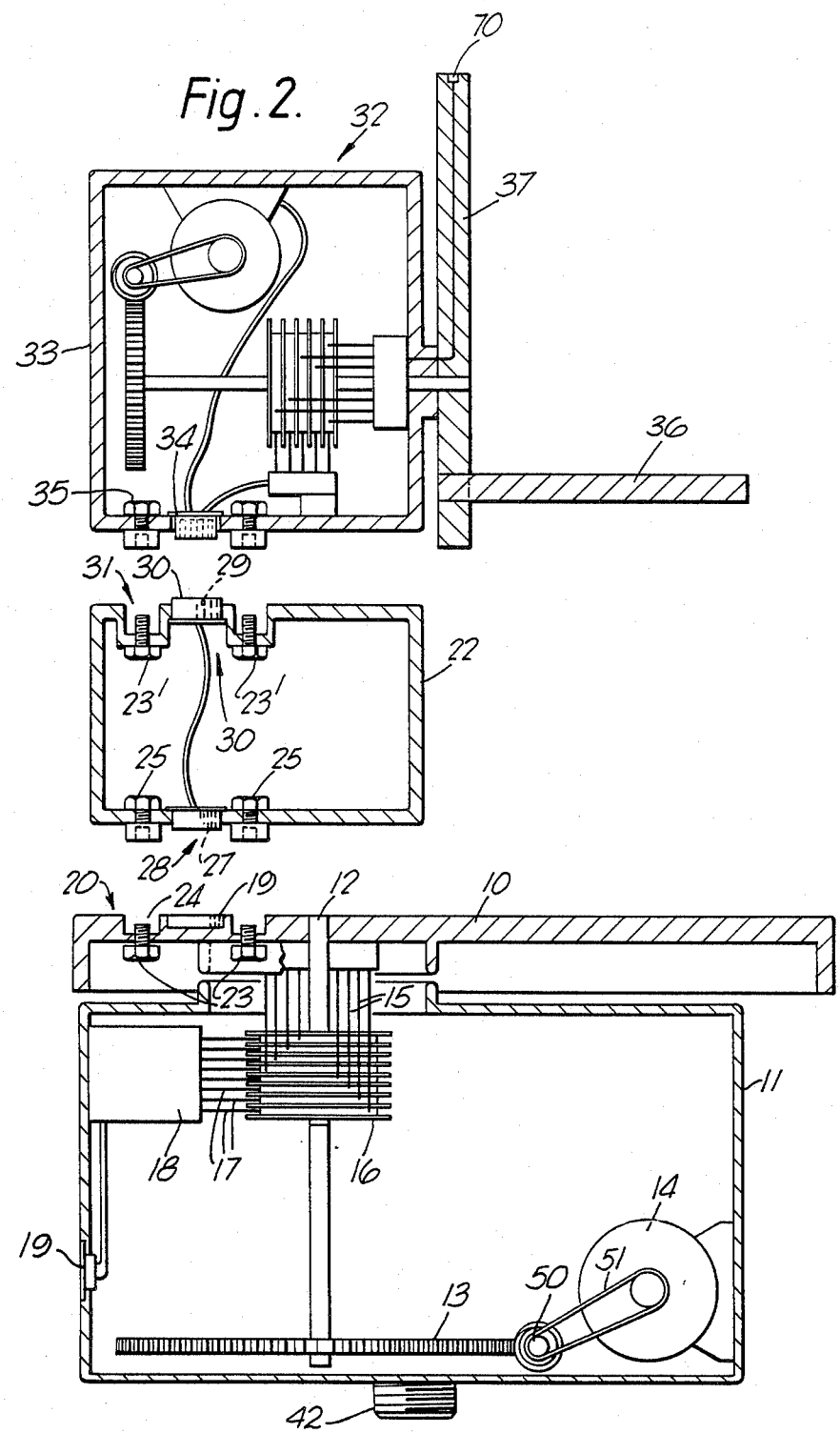
FIG. 2 is a rear view of the mounting head of FIG. 1 with parts cut away to show the interior.

As seen in FIGS. 1 and 2 a platform 10 is mounted on a base 11 via a shaft 12 which is driven via a gear wheel 13, worm drive 50, and belt 51 by an electric motor 14. The base has a threaded boss 42 for connection to a tripod, crane arm or other support.

Mounted on shaft 12 to rotate therewith and with platform 10 are a series of studs 15 each providing an electrical connection to a slip ring 16, and in turn brushes 17 mounted in a mounting 18 in the base provide an electrical connection to an input socket 19 in the base. (The side of the base 11 has been cut away in the view of FIG. 2).

The studs 15 are in turn connected to an electrical socket 19 in the platform located at a platform fixing point 20.

Figure 3:
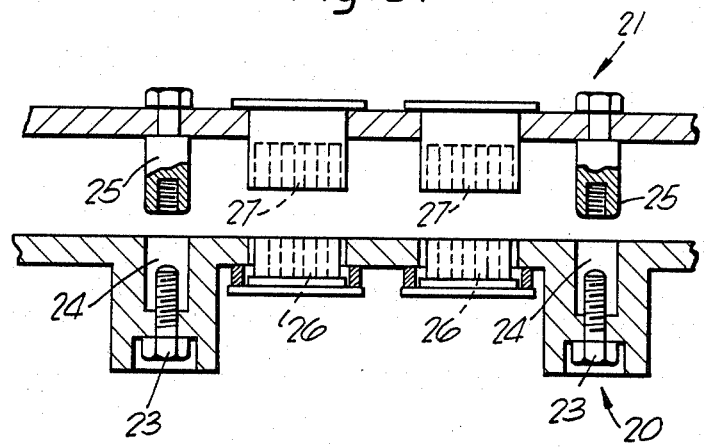
FIG. 3 is a detail of fixing points used in the mounting head of FIG. 1.

Details of the fixing point 20 are shown in FIG. 3, which also shows details of a mating fixing point 21 in an intermediate module 22.

Fixing point 20 is provided with four securing bolts 23 and holes 24 into which location pins 25 at fixing point 21 can be fitted to connect up with the bolts 23 to secure the intermediate module 22 to the platform 10.

The socket 19 comprises wipers 26 which mate with wipers 27 of an electrical connector 28 which has its individual wipers connected to individual wipers 29 of an electrical socket 30 at fixing point 31 on the opposite side of module 22.

Socket 30 and fixing point 31 are of identical construction to socket 19 and fixing point 20 of platform 10.

Mounting module 31 has a motor casing 3 with a socket 34 and fixing point 35 of identical construction to connection 28 and fixing point 21 of the intermediate module 22. This allows the mounting module to be connected either directly to platform 10, or indirectly via intermediate module 22 which thus serves as a riser block.

Figure 4:
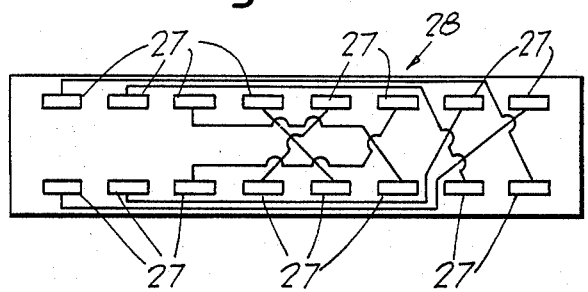
FIG. 4 shows a detail of electrical connections.

As illustrated in FIG. 4 the wipes 27 (or 28) are arranged with central symmetry with opposite wipers cross-connected. This allows the mounting module 32 to be inserted in two different orientations and FIGS. 5A, 5B, 5C, and 5D illustrate the various possible configurations with and without intermediate module 22.

Figure 5A:
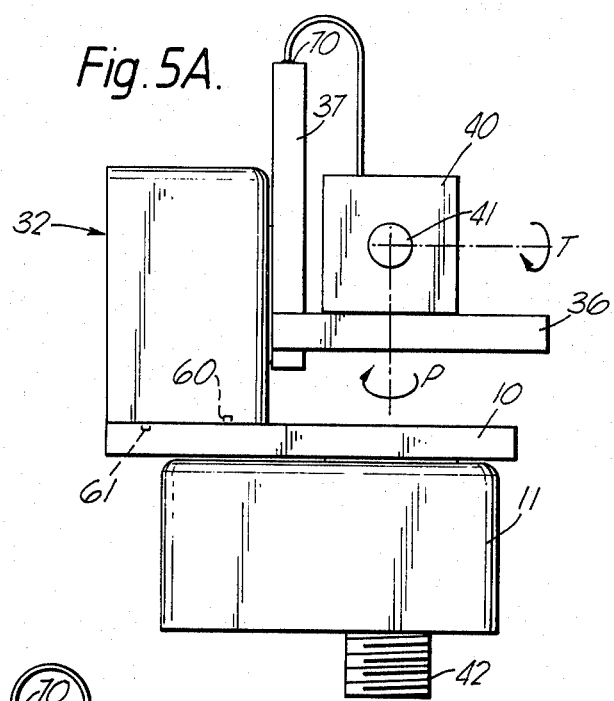

The views in FIGS. 5A to 5D show possible configurations. FIG. 5A illustrates the mounting module 32 mounted directly on the platform 10 to give panning about an axis indicated by P and tilting about an axis indicated by T. A schematically illustrated camera 40 with lens 41 is mounted on a plate 36 fastened to an upright 37 rotatably mounted on motor casing 33 and driven by a motor (not shown). The position of plate 36 relative to upright 37 is adjustable to accommodate different sizes of camera. A socket 70 on the top of upright 37 provides for electrical connections for a camera.

Figure 7:
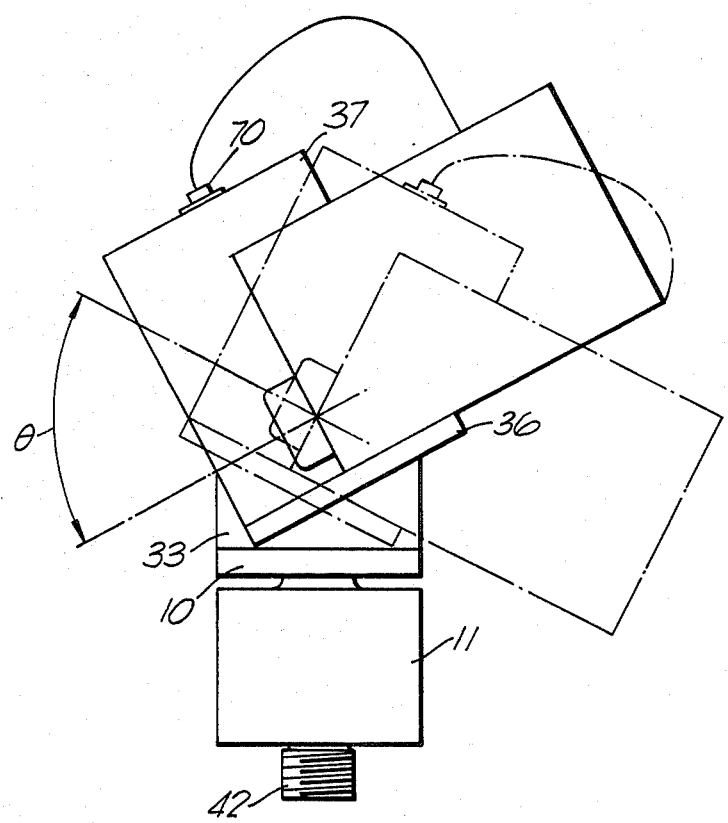
FIG. 7 shows a mounting and a camera in two possible angular positions.

The configuration of FIG. 5A allows tilting and panning about axes passing through the nodal point of the camera, but as can be seen in FIG. 7 tilting is limited to the range indicated by the angle 0, because platform 10 blocks movement beyond this angle. For many applications such tilting angle may be all that is needed.

In FIG. 5B the mounting module 32 has been placed on platform 10 in an orientation differing by 180 degrees. Now tilting through 360 degrees is possible, but the camera moves in a circular arc when panning.

Figure 5C:
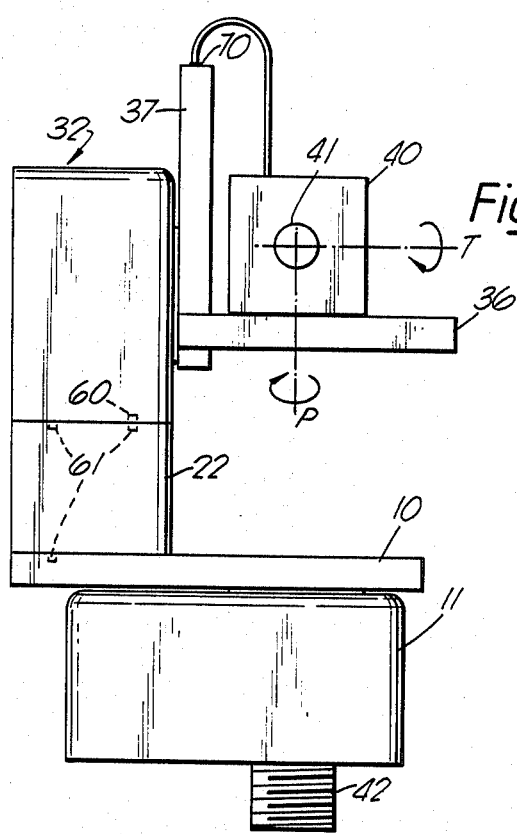

In the configuration of FIG. 5C with the intermediate module 22 inserted both tilting and panning is possible through 360 degrees about the nodal point of the camera, though the profile of the mounting is thus necessarily higher.

In the configuration of FIG. 5D the module 22 has been reversed so that in panning the camera travels in a circular arc. This may be useful if the space in which the camera is to be used is partly obstructed.

The platform 10 can rotate through 360 degrees and has a fixing point located off-centre from its pivot point, but in the same plate (FIG. 1). This fixing point allows the next module to be attached to the platform 10 so that when the platform 10 rotates the module moves in an arc about the platform's pivot point. The module can be rotated to be at different angular positions at its fixing point before being secured in position.

The mounting module 32 illustrated is a tilt module of similar construction to the base unit in that its main components consist of an electric motor and gearbox with slip rings incorporated, which when rotated move an angle plate 36, 37 arrangement mounted in the side of the module (called the camera baseplate). The camera baseplate is the usual place for the camera to be mounted and as the axis on which this rotates (Arrow B) is at 90 degrees to the axis of the platform casting the camera can be made to tilt when mounted on the camera baseplate with the lens pointing at 90 degrees to the axis of the camera baseplate (Arrows C). If the cameras lens is fixed so that it points along the axis of the camera baseplate (Arrow D) rotation of the camera baseplate will give the camera spin.

A control circuit is provided in module 33 to govern the extent to which its motor can be driven to product tilting. Referring to FIGS. 5A, 5B, 5C and 5D, the control circuit comprises a microswitch 60 in the base of module 33 which will be activated only if there is no hole 61 in the module 22 or platform 10 opposite it.

It will be seen that only in the configuration of FIG. 5A will no hole 61 be opposite microswitch 60, and thus the control circuit is activated only to allow the motor to tilt plate 36 and upright 37 within the limited range in which they do not interfere with platform 10.

It is desirable to avoid using electrical connectors for the purpose of mechanically aligning the two units at each fixing point. This could lead to damage of contact wipers in conditions of rough treatment. Use of location pins 25 ensures that both halves of the fixing point are positioned with the electrical connectors in line before the two mating faces come into contact. By using a symmetrical arrangement for the positioning of locating pins and electrical connectors both halves of the fixing points can be positioned in more than one radial setting with both the centre-point of the casing and the electrical connections maintained.

The electrical connectors can take many different formats, but it is always preferred that when units are brought together at their fixing points the electrical linking of the one unit to the other is made without the need for manually linking wires and connectors in a separate operation.

The fixing point (FIG. 3) shows one unit having four location pins 25 mounted on the face of fixing point 21 with a multipin electrical connector positioned in the centre of the location pins 25. The other unit mating fixing point 19 has on its face four holes 24 to accept the location pins with a compatible electric connector 19 positioned in the centre of the holes allowing both connectors 19 and 28 to interlock without strain when the location pins of one unit are aligned with the holes of the other.

By using multipin electrical connectors that have more electrical contacts than the number of electrical connections actually needed between the two units (e.g. if four signals are needed then a connector with eight or more pins is used), the electrical contacts or wipers can be wired so that when the two units are fixed together in different radial locations the polarity of the electrical links are not reversed.

Once the two fitting points have been brought together both units can be locked in position by the use of one or more securing bolts 23 or by the use of clamps/latches.

The method just detailed is one of many ways to achieve the fixing point desired between the units and modules of the remote head. Another way is to use a single ring register on one unit with a mating annular groove on the other (this could replace the location pins detailed earlier), such a combination existing for each electrical path connection desired.

Instead of multipin connectors a round jack plug (similar to the type used on stereo headphones) could be fixed in the middle of this register with a compatible socket positioned in the centre of the annular groove of the other unit. This arrangement would give more angular positions to each fixing point.

It should be noted that the slip ring details described are just one of many well known formats that could be used to achieve the same end result of allowing electronic signals to pass through revolving parts without the use of leads and wires that can limit rotation or become entangled.

The platform 10 is fixed to a mainshaft 12. Assemblies of slip rings 16 are mounted on shaft 12. Each ring 16 has a stud 15 that passes through the toroidal faces of the other rings 16 to the end of the assembly. These studs 15 have a sleeve insulating them from the other rings. Wires connected to each stud then pass through the centre of the mainshaft remaining static to the mainshaft but rotating with the mainshaft assembly. These wires are then connected to the electric socket 19 of the platform 10. The uninsulated outside diameter of each slip ring provides a cylindrical surface on which a non-rotating brush 17 or other contact is held by spring to give a path for signals to pass from an input 19 in the base through each slip ring along its stud through the wire attached and to the pin on the multipin connector.

Figure 6:
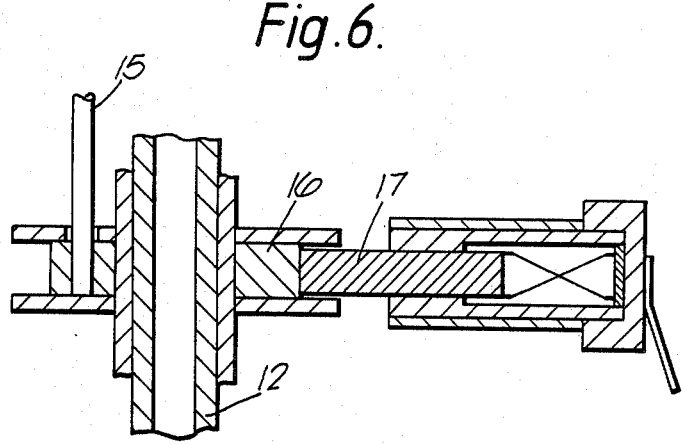
FIG. 6 illustrates a detail of a slip ring arrangement.

FIG. 6 shows details of only one of the slip rings with its contact brush, these slip rings with its contact brush, these slip rings are stacked together to produce slip ring assemblies of the required number of channels.

The mounting head described can be made still more versatile by providing intermediate modules of other shapes, for example to raise the mounting module still higher, or to locate it on an extension arm. The cost would still be reasonable and handling easy, as user will be using the same base module and mounting module, and removing or changing the intermediate module is easy.

The mounting head has been described with reference to use with a camera, but numerous other uses for example for spot lights, flood lights, theodolites or telescopes (for example in tracking stars) are possible. The versatility of the mounting head of the invention ensures that the user who initially has one specialist application in mind is not then left with expensive equipment which cannot be put to any other use.

The mechanical and electrical construction described can obviously be varied to suit the circumstances of intended use or for ease of manufacture.

What we claim is:

1. A mounting head for apparatus to be orientated comprising: a base, a drive contained in the base, a platform mounted on the base for rotation by the drive, a mounting module for mounting the apparatus to be orientated, mechanical fixing means on the platform and mating mechanical fixing means on the mounting module for releasably securing it to the platform, a fixed electrical input in the base, an electrical socket in the platform and a plurality of electrical connections between said electrical socket and said fixed electrical input which are maintained during rotation of the platform relative to the base;

an intermediate module having two mechanical fixing means, one matching that on the platform and the other that on the mounting module, to allow the mounting module to be releasably secured to the platform via said intermediate module;

the mounting module further comprising an electrical connector matching the platform electrical socket which provides electrical connections to an electrical output in the mounting module.

2. A mounting head as set forth in claim 1 wherein the mounting module comprises a mounting plate rotatably mounted on a motor unit containing a drive for rotating the mounting plate.

3. A mounting head as set forth in claim 1 wherein the electrical socket and electrical connector are so formed and positioned on the platform and mounting module respectively that in positioning the platform and mounting module respectively that in positioning the mounting module on the platform for connection by the mechanical fixing means, the proper electrical contact will automatically be established, and wherein the intermediate module comprises an electrical connector matching the electrical socket on the platform and an electrical socket matching the electrical connector on the mounting module, and electrical connection between these located inside the intermediate module.

4. A mounting head as set forth in claim 1 wherein the mechanical fixing means allow the mounting module to be mounted on the platform in at least two different orientations.

5. A mounting head as set forth in claim 4 wherein the mounting module can be installed in two orientations on the platform different by 180 degrees, and the electrical connectors and sockets are made centrally symmetric with symmetrically opposite individual connectors in a socket connected to one another, so that correct electrical contact can be achieved irrespective of orientation of the mounting module on the platform.

6. A mounting head as set forth in claim 2 wherein the mounting module can be fixed to the platform in two different orientations, and wherein the mounting module comprises a limiter on the extent of possible rotation of the mounting plate, and a sensor which senses in which orientation the mounting module is fixed to the platform and is adapted to activate the limiter in one orientation but inactivates it in the other orientation.

7. A mounting head as set forth in claim 1 wherein the mounting module comprises a limiter on the extent of possible rotation of the mounting plate, and a sensor which senses whether the mounting module is fixed to the platform direct or via the intermediate module, and is adapted to activate the limiter in the former case but not in the latter.

8. A mounting head as set forth in claim 7, wherein the sensor is a microswitch which is not activated if the mounting module is secured to the intermediate module which is so formed as to have a hole opposite the microswitch.

* * * * *